(12) United States Patent
Boyer et al.

(10) Patent No.: US 7,974,257 B2
(45) Date of Patent: Jul. 5, 2011

(54) COMMUNICATIONS SYSTEM USING FRAME STRUCTURE FOR DIFFERENT WIRELESS COMMUNICATIONS PROTOCOLS AND RELATED METHODS

(75) Inventors: Adrian Boyer, Pittsford, NY (US); Michael Buddendeck, Webster, NY (US); David Chauncey, Fairport, NY (US); Thomas Doherty, Webster, NY (US); Mitel Kuliner, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 722 days.

(21) Appl. No.: 12/046,545

(22) Filed: Mar. 12, 2008

(65) Prior Publication Data

US 2009/0232085 A1    Sep. 17, 2009

(51) Int. Cl.
*H04J 1/00* (2006.01)
*H04J 4/00* (2006.01)
(52) U.S. Cl. ............... 370/343; 370/436; 370/478
(58) Field of Classification Search .............. None
See application file for complete search history.

(56) References Cited

U.S. PATENT DOCUMENTS

| 6,130,886 | A | 10/2000 | Ketseoglou et al. | 370/347 |
|---|---|---|---|---|
| 2007/0002898 | A1 | 1/2007 | Boariu et al. | 370/468 |
| 2007/0149187 | A1 | 6/2007 | Levy | 455/425 |
| 2008/0008116 | A1 | 1/2008 | Buga et al. | 370/328 |
| 2008/0130486 | A1 | 6/2008 | Lim et al. | 370/210 |
| 2008/0159239 | A1* | 7/2008 | Odlyzko et al. | 370/337 |
| 2009/0016375 | A1* | 1/2009 | Hsieh et al. | 370/465 |
| 2009/0116430 | A1* | 5/2009 | Bonta et al. | 370/329 |
| 2009/0131110 | A1* | 5/2009 | Balachandran et al. | 455/561 |
| 2009/0201860 | A1* | 8/2009 | Sherman et al. | 370/329 |
| 2010/0278083 | A1* | 11/2010 | Kwak et al. | 370/280 |

FOREIGN PATENT DOCUMENTS

| WO | WO9730526 | 8/1997 |
|---|---|---|
| WO | WO0124458 | 4/2001 |
| WO | WO2004060002 | 7/2004 |

OTHER PUBLICATIONS

Zyren, IEEE 802,11 Explained, Dec. 6, 2001.
Zyren, 802.11g spec: Covering the Basics, EE Times, Feb. 1, 2002.

* cited by examiner

*Primary Examiner* — Nittaya Juntima
(74) *Attorney, Agent, or Firm* — Allen, Dyer, Doppelt, Milbrath & Gilchrist, P.A. Attorneys at Law

(57) ABSTRACT

A communications system may include a first wireless communications device communicating based upon a first wireless communications protocol, a second wireless communications device communicating based upon a second wireless communications protocol different from the first wireless communications protocol, and a wireless base station. The wireless base station may communicate with the first wireless communications device and the second wireless communications device based upon a frame structure. The frame structure may be defined by sub-carriers at respective different frequencies and symbols at respective different times. The frame structure may include a frame control header, a first frame portion for communicating with the first wireless communications device based upon the first wireless communications protocol, and a second frame portion for communicating with the second wireless communications device based upon the second wireless communications protocol.

17 Claims, 5 Drawing Sheets

COMMUNICATIONS SYSTEM USING FRAME STRUCTURE FOR DIFFERENT WIRELESS COMMUNICATIONS PROTOCOLS AND RELATED METHODS

FIELD OF THE INVENTION

The present invention relates to the field of communications systems, and, more particularly, to communications systems using different wireless communications protocols and related methods.

BACKGROUND OF THE INVENTION

A typical wireless communications system comprises a plurality of wireless communications devices exchanging data with each other. In some wireless communications systems, for example, infrastructure networks, the system may further comprise a wireless base station for managing communications between the wireless communications devices. In other words, each intra-system communication would be exchanged via the wireless base station. In other wireless communications systems, for example, mesh networks and ad hoc wireless networks, the wireless base station may be omitted, i.e. the wireless communications devices may communicate directly with each other.

The wireless communications devices may communicate with each other based upon a wireless communications protocol, for example, IEEE 802.11. The wireless communications protocol comprises a set of standard rules regulating how the wireless communications devices communicate with each other and includes functions commonly needed during communication. The wireless communications system typically supports a fixed set of wireless communications protocols that correspond to respective wireless communications device types. As a wireless communications system supports more wireless communications protocols, the overhead used to operate the communications system may increase to undesirable levels that may impact performance. For example, U.S. Patent Application Publication No. 2008/0008116 to Buga et al. discloses a communications system supporting a plurality of wireless communications protocols.

Another potential drawback to the wireless communications system supporting more than one type of wireless communications device type-protocol is the difficulty of scheduling communications in the system to avoid interference. For example, listen-before-talk approaches, such as, carrier sense multiple access/collision avoidance (CSMA/CA), may be difficult to use since each wireless communications device may not be able to hear the other wireless communications devices' communications. For scheduling of communications in the wireless communications system using these listen-before-talk approaches, the transmitting wireless communications device listens for current transmissions from other wireless communications devices in the system before transmitting its own data.

An approach to the above drawback is a request-to-send/clear-to-send (RTS/CTS) method. For example, the IEEE 802.11 g wireless communications protocol uses this approach. In the RTS/CTS approach, before initiating a transmission, a transmitting wireless communications device sends a RTS message to the wireless base station. The wireless communications device then awaits a CTS message before stating communications. In other words, the wireless base station acts as a "virtual traffic cop" at an intersection of virtual streets, the number of virtual streets determined by the number of wireless communications devices in the wireless communications system. Unfortunately, the RTS/CTS approach may increase the overhead in the wireless communications system.

The IEEE 802.16 (WIMAX) wireless communications protocol is a robust technology aimed at providing metropolitan area networks. The WiMAX wireless communications protocol may provide for: long transmission ranges in the order of kilometers, robust quality-of-service (QoS) features, and scalability. Although WiMAX wireless communications devices may be desirable for certain applications, they may not integrate easily into existing and legacy wireless communications systems. Moreover, precise scheduling of transmissions and resource allocation in the communications system may be desirable.

SUMMARY OF THE INVENTION

In view of the foregoing background, it is therefore an object of the present invention to provide a communications system that may integrate wireless communications devices more efficiently and with less overhead.

This and other objects, features, and advantages in accordance with the present invention are provided by a communications system including at least one first wireless communications device communicating based upon a first wireless communications protocol, at least one second wireless communications device communicating based upon a second wireless communications protocol different from the first wireless communications protocol, and a wireless base station. The wireless base station may communicate with the at least one first wireless communications device and the at least one second wireless communications device based upon a frame structure defined by a plurality of sub-carriers at respective different frequencies and a plurality of symbols at respective different times. The frame structure may comprise a frame control header, a first frame portion for communicating with the at least one first wireless communications device based upon the first wireless communications protocol, and a second frame portion for communicating with the at least one second wireless communications device based upon the second wireless communications protocol. Advantageously, the communications system may communicate with wireless communications devices of differing types efficiently and with less overhead.

In some embodiments, the first wireless communications device may comprise an orthogonal frequency-division multiple access (OFDMA) wireless communications device. Additionally, the wireless base station may comprise an OFDMA wireless base station, and the symbols may comprise a plurality of OFDMA symbols. In other embodiments, the wireless base station may comprise an 802.16 WiMAX base station. Moreover, the first wireless communication device may comprise an 802.16 WiMAX device.

More specifically, the first and second frame portions may each have a respective encoding and a respective capacity allocation. The respective encodings may be based upon at least one transmission characteristic for a corresponding wireless communications device. The respective capacity allocations may be based upon at least one traffic condition at the corresponding wireless communications device.

For example, the first wireless communications device may comprise a plurality thereof. The frame structure may further comprise a third frame portion, and the first wireless communications devices may communicate directly with each other based upon the third frame portion. The frame structure may also allocate the frame control header to extend across the plurality of sub-carrier frequencies. Furthermore, the frame control header may comprise a preamble, an uplink map, and a downlink map. The wireless base station may selectively allocate the second frame portion to take over at least a portion of the frame control header.

Another aspect is directed to a method of operating a communications system comprising at least one first wireless communications device communicating based upon a first wireless communications protocol, at least one second wireless communications device communicating based upon a second wireless communications protocol different from the first wireless communications protocol, and a wireless base station. The method may comprise communicating with the first wireless communications device and the second wireless communications device based upon a frame structure. The frame structure may be defined by a plurality of sub-carriers at respective different frequencies and a plurality of symbols at respective different times. The frame structure may comprise a frame control header, a first frame portion for communicating with the first wireless communications device based upon the first wireless communications protocol, and a second frame portion for communicating with the second wireless communications device based upon the second wireless communications protocol.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
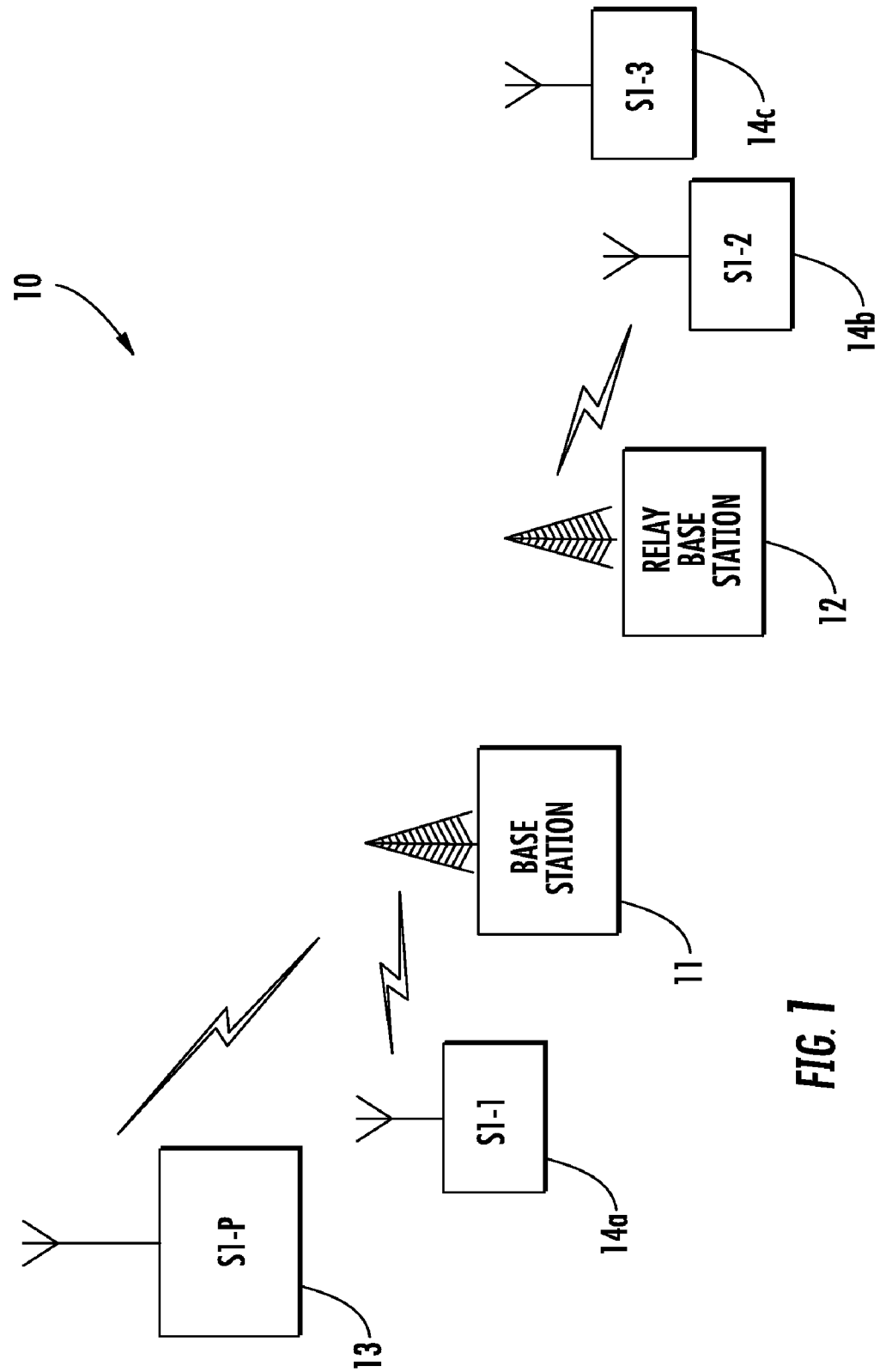
FIG. 1 is a schematic diagram of a communications system according to the present invention.
Figure 2:
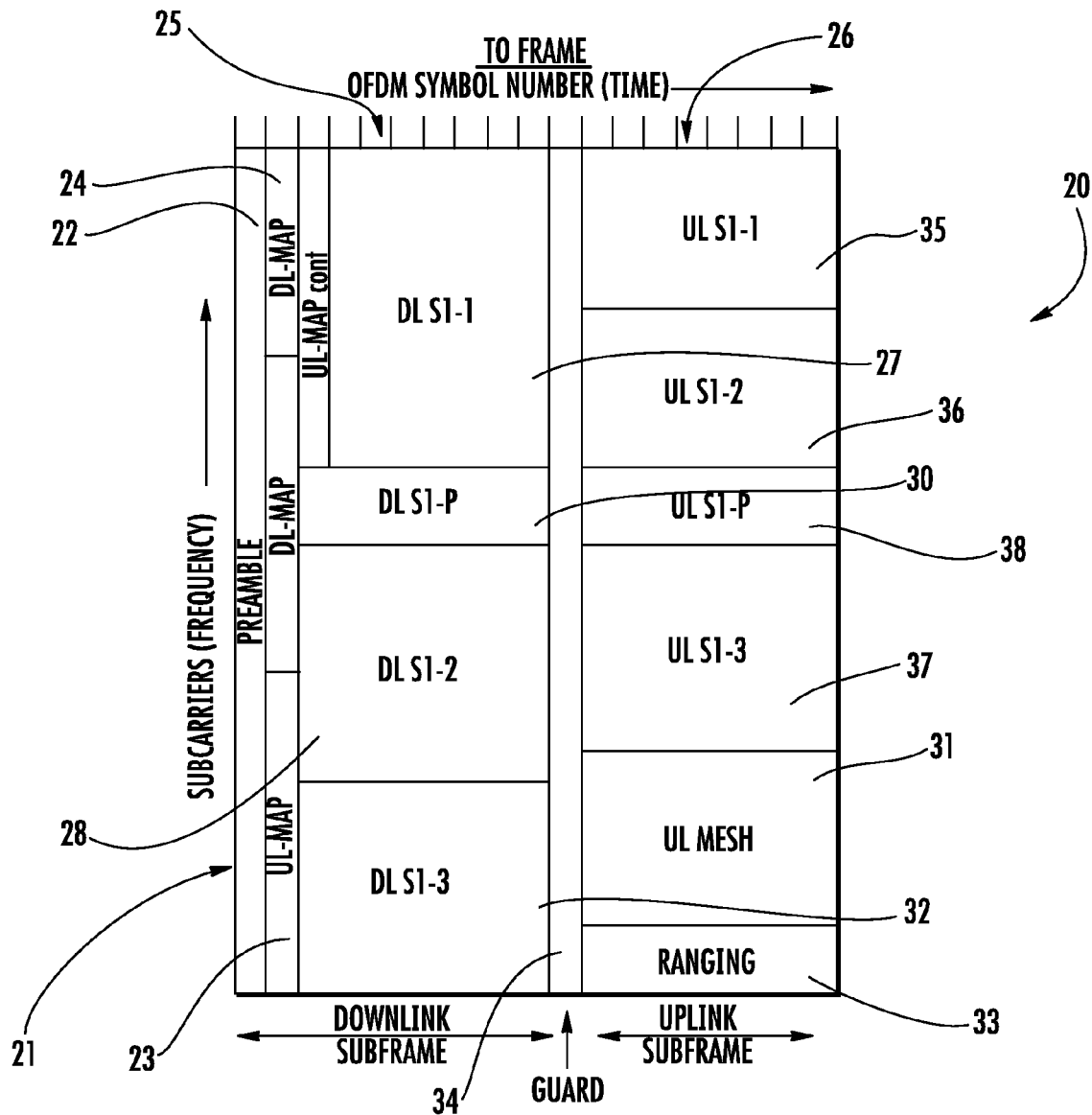
FIG. 2 is a schematic diagram of a frame structure used by the communications system in FIG. 1.

Referring initially to FIGS. 1-2, a communications system 10 illustratively includes a plurality of first wireless communications devices 14a-14c communicating based upon a first wireless communications protocol. For example, the first wireless communications devices 14a-14c may each comprise an orthogonal frequency-division multiple access (OFDMA) wireless device, such as, an IEEE 802.16 (WiMAX) wireless device. The communications system 10 also illustratively includes a second wireless communications device 13 communicating based upon a second wireless communications protocol different from the first wireless communications protocol. The second wireless communications device 13 may comprise, for example, a broadband ethernet radio RF-7800 W device, as available from the Harris Corporation of Melbourne, Fla. and as modified by the teachings disclosed herein, the assignee of the present application. As will be appreciated by those skilled in the art, the second wireless communications device 13 may also comprise an OFDMA wireless device. Alternatively the second wireless communications device 13 may comprise a very high frequency (VHF) or an ultra high frequency (UHF) combat net radio, such as, the RF-5800V or RF-5800M, as available from the Harris Corporation of Melbourne, Fla. and as modified by the teachings disclosed herein. Moreover, the communications system 10 may alternatively include a plurality of the second wireless communications devices 13 of the same or different type.

The communications system 10 illustratively includes a wireless base station 11 and a wireless relay base station 12. Alternatively, the communications system 10 may include only a wireless base station 11. For example, the wireless base station 11 and the wireless relay base station 12 may comprise an OFDMA base station, such as, a WiMAX base station, and an OFDMA relay base station, such as, a WiMAX relay base station, respectively. The wireless base station 11 communicates with the first wireless communications devices 14a-14c and the second wireless communications device 13 based upon a frame structure 20 defined by a plurality of sub-carriers at respective different frequencies and a plurality of symbols, for example, OFDMA symbols, at respective different times. The frame structure 20 illustratively includes a downlink subframe 25, an uplink subframe 26, and a guard 34 delineating the subframes therebetween, as perhaps best understood with reference to FIG. 2.

The frame structure 20 illustratively includes a frame control header 21 that illustratively extends across the plurality of sub-carrier frequencies, a first frame portion for communicating with the first wireless communications devices 14a-14c based upon the first wireless communications protocol, and a second frame portion for communicating with the second wireless communications devices 13 based upon the second wireless communications protocol. The first frame portion includes downlink allocations 27, 28, 32 and respective uplink allocations 35, 36, 37 corresponding to each of the first wireless communications devices 14a-14c. The second frame portion illustratively includes a downlink allocation 30 and a respective uplink allocation 38 for the second wireless communications device 13. In embodiments having a plurality of the second wireless communications device 13, the second frame portion of the frame structure 20 would further include corresponding downlink and uplink allocations for each second wireless communications device 13.

The communications system 10 allots a "strip" in the frame structure 20 to the second frame portion (communications with the second wireless communications device 13) to accommodate the second wireless communications protocol. For example, the frame structure 20 may have a bandwidth of 5.0 MHz at a transmit/receive frequency of 2.5 GHz, and the second wireless communications device 13 may have a 22 MHz bandwidth at 2.414 GHz, then the second frame portion occupies the strip, defined by adjacent blocks 30, 38. As will be appreciated by those skilled in the art, a proprietary physical protocol layer may be placed in parallel with a first wireless communications device 14a-14c physical protocol layer, both of which may converge in a modified Media Access Control (MAC) protocol layer.

The first and second frame portions each have a respective encoding and a respective capacity allocation for each wireless communications device 13, 14a-14c. Each encoding and capacity allocation may be independent from the other. More specifically, each set of respective downlink and uplink allocations 27/35, 30/38, 28/36, 32/37 has a corresponding encoding that is based upon at least one transmission characteristic for a corresponding wireless communications device 13, 14a-14c. The transmission characteristic may comprise, for example, signal-to-noise ratio, or bit error rate. The capacity allocations are based upon at least one traffic condition, for example, data transmission queue size, at the corresponding wireless communications device 13, 14a-14c.

Advantageously, for wireless communications devices 14a-14b within close physical proximity to the wireless base stations 11, 12, the communications system 10 may select a high capacity modulation and associated encoding, for example, quadrature amplitude modulation (QAM) 64. Moreover, the communications system 10 may allocate a smaller portion of the frame structure 20 to respective uplink and downlink allocations for these high capacity wireless communications devices 14a-14b.

The frame structure 20 illustratively includes a third frame portion 31. The first wireless communications devices 14a-14c and second wireless communications device 13 communicate directly with each other based upon the third frame portion 31. The third frame portion 31 comprises a mesh communications allocation for ad hoc/mesh mode operation in the communications system 10. As will be appreciated by those skilled in the art, the third frame portion 31 may permit a backhaul connection for wireless communications devices 13, 14a-14c out of range of the base stations 11, 12. Each wireless communications device 13, 14a-14c may continuously monitor the third frame portion 31 for wireless communications devices that may need a backhaul connection. Any wireless communications device 13, 14a-14c may use the third frame portion 31 for ad hoc/mesh mode operation so long as the particular wireless communications device can broadcast in that region.

As will be appreciated by those skilled in the art, the frame structure 20 illustratively includes a ranging frame portion 33 for obtaining information on the communications system 10 setup and to synchronize the communications link between a wireless communications device 13, 14a-14c and a wireless base station 11, 12. In particular, the ranging frame portion may be used to determine wireless communications device 13, 14a-14c presence for either network entry, handover, or bandwidth contention, wireless communications device timing offset, and wireless communications device frequency offset, for example.

Depending on the properties of the second wireless communications protocol of the second wireless communications device 13, the communications system 10 may allocate subcarrier frequencies to the downlink 30 and uplink 38 allocations for the second wireless communications device. For example, the communications system 10 may allocate one subcarrier frequency or a plurality thereof to the second wireless communications device 13. Moreover, communications system 10 prevents downlink 27, 28, 32 and uplink 35-37 allocations for the first wireless communications devices 14a-14c from overlapping with those 30, 38 of the second wireless communications device 13, thereby preventing undesired interference in the communications system.

Furthermore, the frame control header 21 illustratively includes a preamble 22, an uplink map 23, and a downlink map 24. The uplink map 23 includes data relating to the locations of the uplink allocations 35-38 in the frame structure 20. The downlink map 24 includes data relating to the locations of the downlink allocations 27-28, 30, 32 in the frame structure 20. Advantageously, the uplink 23 and downlink 24 maps provide for precise scheduling and resource optimizations for transmissions in the communications system 10.

Figure 3:
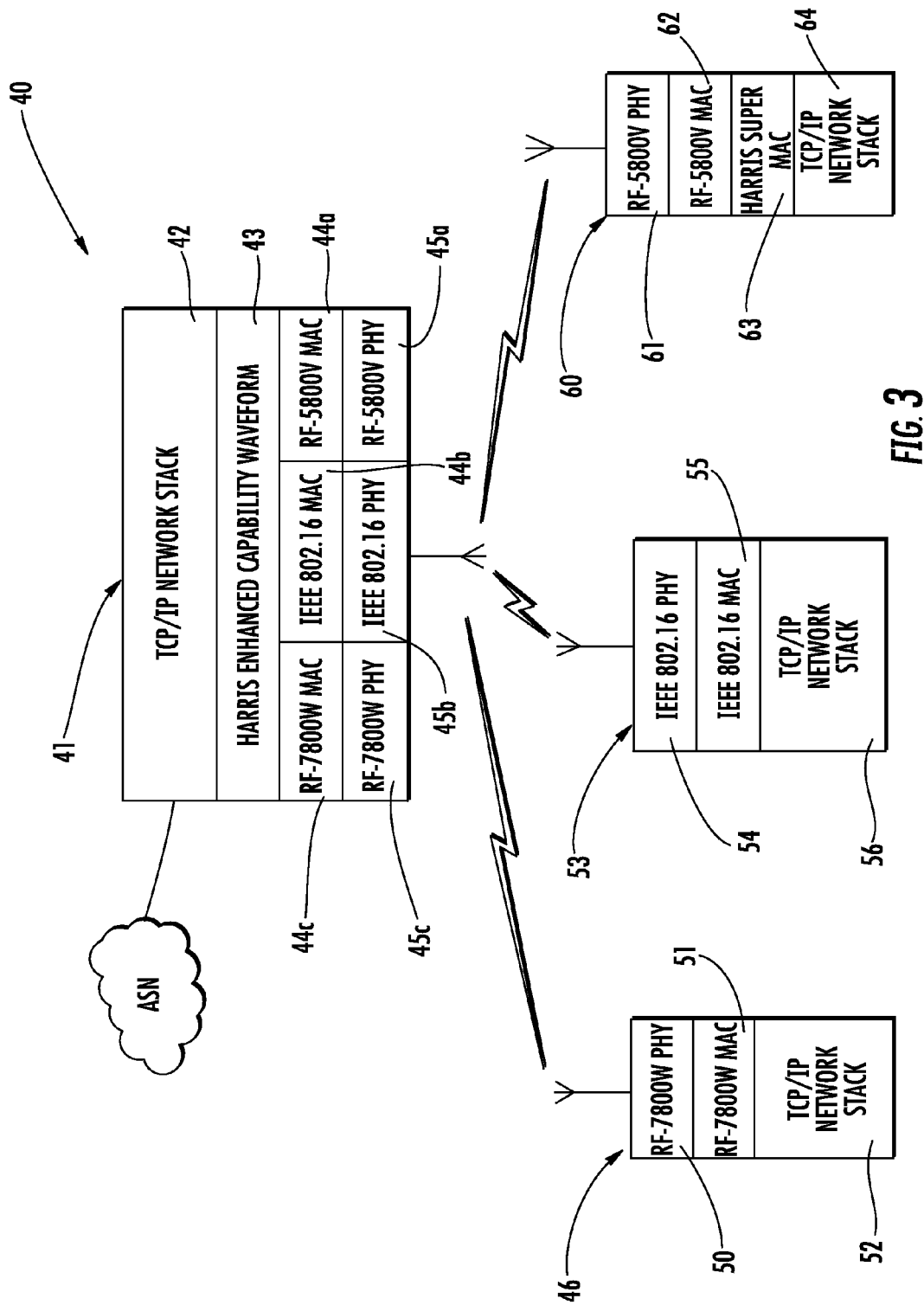
FIG. 3 is a schematic diagram of the wireless protocol stack used by the communications system in FIG. 1.

Referring now additionally to FIG. 3, an exemplary protocol stack 40 for the communications system 10 is now described. As will be appreciated by those skilled in the art, the protocol stack 40 relates to an exemplary distribution of device types. More specifically, the protocol stack 40 includes a protocol stack 53 for a first wireless communications device 14a, the device being a WiMAX wireless device. The protocol stacks for other first wireless communications devices 14b-14c would be similar. The protocol stack 53 includes a Transmission Control Protocol and Internet Protocol (TCP/IP) protocol layer 56, a MAC protocol layer 55 on top of the TCP/IP protocol layer, and a physical layer 54 on the MAC layer.

Moreover, the protocol stack 40 includes a protocol stack 46 for a second wireless communications device 13, the device being a RF-7800W device, as available from the Harris Corporation of Melbourne, Fla., the assignee of the present application. The protocol stack 46 includes a TCP/IP protocol layer 52, a MAC protocol layer 51 on top of the TCP/IP protocol layer, and a physical layer 50 on the MAC layer.

As discussed above, the communications system 10 may include a plurality of second wireless communications devices 13. The second wireless communications devices 13 may comprise a single type or a plurality thereof. For example, the protocol stack 40 includes two protocol stacks for two types of second wireless communications devices 13, a RF-7800W and a RF-5800V, both available from the Harris Corporation of Melbourne, Fla., the assignee of the present application. The RF-5800V protocol stack 60 includes a TCP/IP protocol layer 64, a super MAC layer 63, a MAC protocol layer 62 on top of the super MAC layer, and a physical layer 61 on the MAC layer.

The protocol stack 40 illustratively includes a wireless base station protocol stack 41. The wireless base station protocol stack 41 includes a TCP/IP stack 42, an enhanced compatibility waveform 43 below the TCP/IP stack, respective MAC layers 44a-44c for each wireless communications device 13, 14a-14c in the communications system 10, and respective physical layers 45a-45c for each wireless communications device in the communications system. Advantageously, the wireless base station protocol stack 41 implements all the individual protocol stacks for each wireless communications device 13, 14a-14c in the communications system 10. As will be appreciated by those skilled in the art, the enhanced compatibility waveform 43 sits atop the individual protocol stacks and integrates them together.

Figure 4:
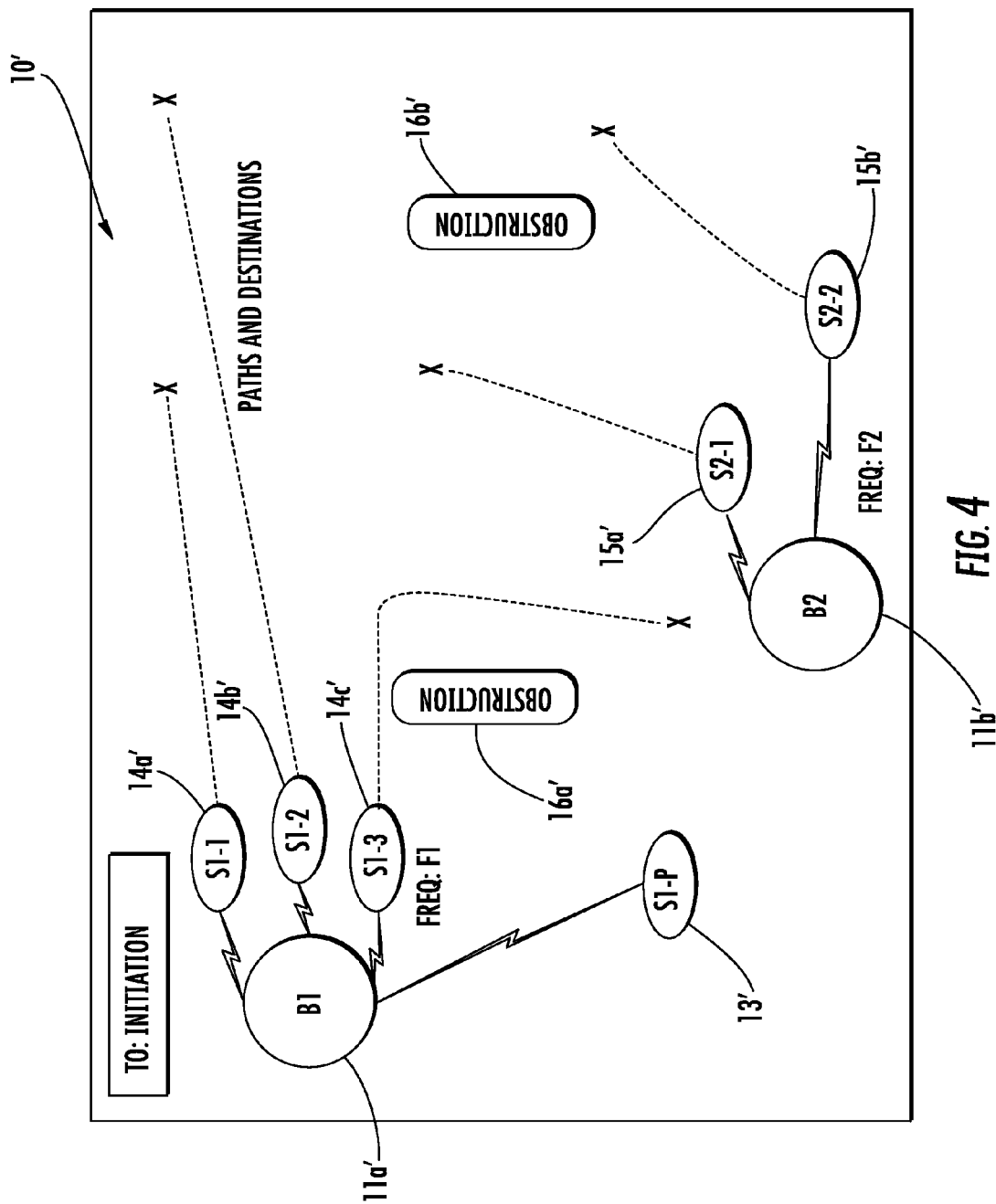
FIG. 4 is a second schematic diagram of a communications system according to the present invention.

Referring now to FIG. 4, an exemplary communications system 10' illustratively includes a pair of WiMAX wireless base stations 11a'-11b', each communicating with respective WiMAX wireless communications devices 14a'-14c' and 15a'-15b', respectively. The communications system 10' illustratively includes a second wireless communications device 13' communicating with the WiMAX wireless base station 11a'. The broken lines indicates paths of movement for the wireless communications devices 14a'-14c' and 15a'-15b', with the X indicating a final destination. Obstructions 16a'-16b' are illustrated and may block communications of the illustrated wireless communications device 14c'. As the wireless communications device 14c' extends beyond the range of the WiMAX wireless base station 11a', the wireless communications device may form a backhaul connection with companion wireless communications devices.

Figure 5:
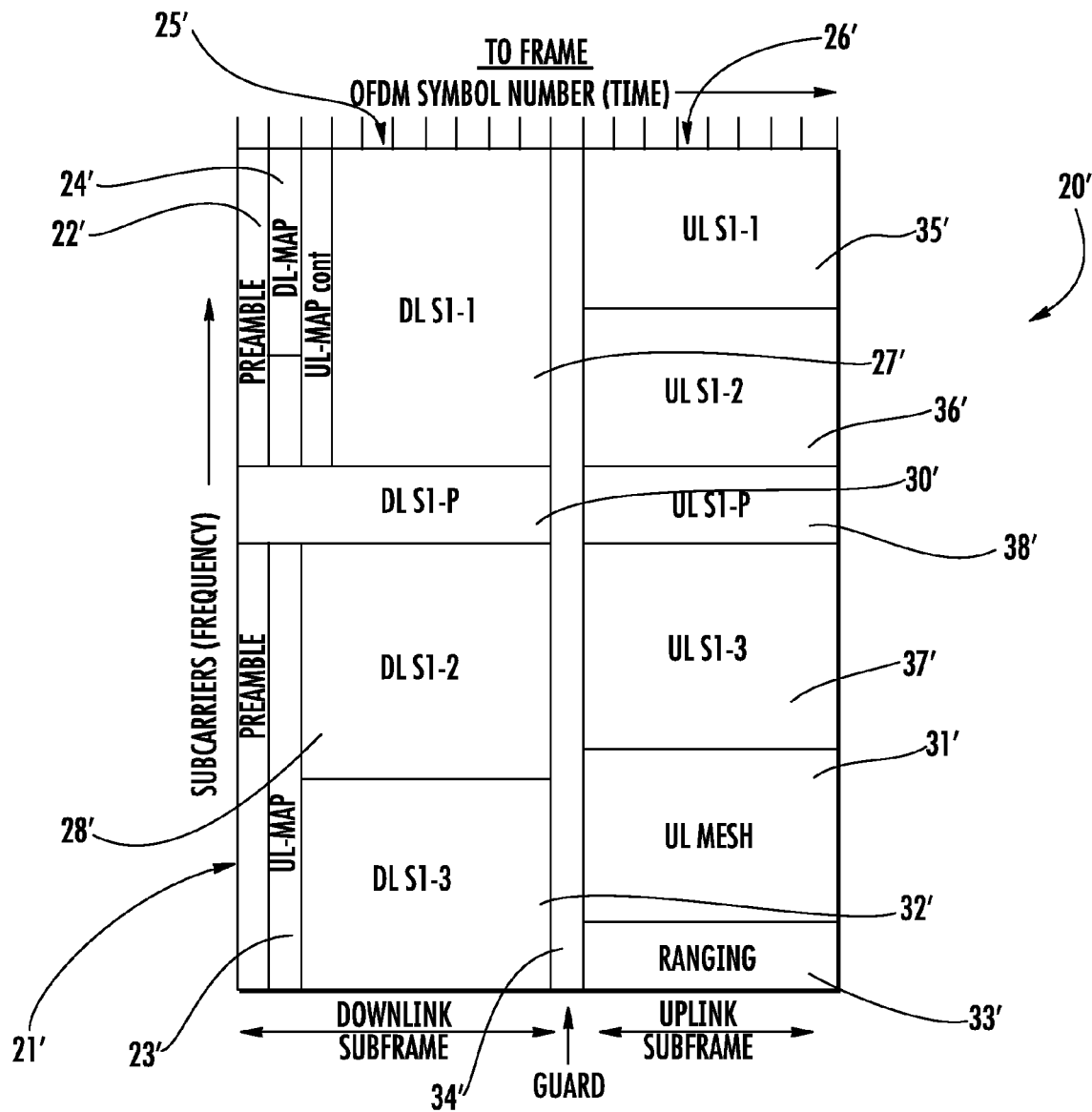
FIG. 5 is a schematic diagram of a second embodiment of the frame structure used by the communications system in FIG. 1.

Referring now additionally to FIG. 5, another embodiment of the frame structure 20' is now described. In this embodiment of the frame structure 20', those elements already discussed above with respect to FIG. 2 are given prime notation and most require no further discussion herein. This embodiment differs from the previous embodiment in that the frame structure 20' comprises a second frame portion comprising a downlink allocation 30' and an uplink allocation 38' that are selectively allocated by the wireless base station 11 to take over at least a portion of the frame control header. Advantageously, this permits the frame structure 20' to accommodate a plurality of types for the second wireless communications device 13.

Another aspect is directed to a method of operating a communications system 10 comprising at least one first wireless communications device 14a-14c communicating based upon a first wireless communications protocol, at least one second wireless communications device 13 communicating based upon a second wireless communications protocol different from the first wireless communications protocol, and a wireless base station 11. The method may comprise communicating with the first wireless communications device 14a-14c and the second wireless communications device 13 based upon a frame structure 20. The frame structure 20 may be defined by a plurality of sub-carriers at respective different frequencies and a plurality of symbols at respective different times. The frame structure 20 may comprise a frame control header 21, a first frame portion for communicating with the first wireless communications device 14a-14c based upon the first wireless communications protocol, and a second frame portion 30, 38 for communicating with the second wireless communications device 13 based upon the second wireless communications protocol.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
a plurality of first wireless communications devices communicating based upon a first wireless communications protocol;
at least one second wireless communications device communicating based upon a second wireless communications protocol different from the first wireless communications protocol; and
a wireless base station communicating with said plurality of first wireless communications devices and said at least one second wireless communications device based upon a frame structure defined by a plurality of sub-carriers at respective different frequencies and a plurality of symbols at respective different times and comprising a frame control header, a first frame portion for communicating with said plurality of first wireless communications devices based upon the first wireless communications protocol, a second frame portion for communicating with said at least one second wireless communications device based upon the second wireless communications protocol, and a third frame portion for direct communications between said plurality of first wireless communications devices.

2. The communications system according to claim 1 wherein said plurality of first wireless communications devices comprises at least one orthogonal frequency-division multiple access (OFDMA) wireless communications device; wherein said wireless base station comprises an OFDMA wireless base station; and wherein the plurality of symbols comprises a plurality of OFDMA symbols.

3. The communications system according to claim 1 wherein the first and second frame portions each have a respective encoding and a respective capacity allocation.

4. The communications system according to claim 3 wherein the respective encodings are based upon at least one transmission characteristic for a corresponding wireless communications device; and wherein the respective capacity allocations are based upon at least one traffic condition at the corresponding wireless communications device.

5. The communications system according to claim 1 wherein the frame structure allocates the frame control header to extend across the plurality of sub-carrier frequencies.

6. The communications system according to claim 1 wherein the frame control header comprises a preamble, an uplink map, and a downlink map.

7. The communications system according to claim 1 wherein said wireless base station selectively allocates the second frame portion to take over at least a portion of the frame control header.

8. The communications system according to claim 1 wherein said wireless base station comprises an 802.16 WiMAX base station; and wherein said plurality first wireless communication devices each comprises an 802.16 WiMAX device.

9. A communications system comprising:
a plurality of orthogonal frequency-division multiple access (OFDMA) wireless communications devices communicating based upon a first wireless communications protocol;
at least one second wireless communications device communicating based upon a second wireless communications protocol different from the first wireless communications protocol; and
an OFDMA wireless base station communicating with said plurality of first OFDMA wireless communications devices and said at least one second wireless communications device based upon a frame structure defined by a plurality of sub-carriers at respective different frequencies and a plurality of OFDMA symbols at respective different times and comprising a frame control header, a first frame portion for communicating with said plurality of first OFDMA wireless communications devices based upon the first wireless communications protocol, a second frame portion for communicating with said at least one second wireless communications device based upon the second wireless communications protocol, the first and second frame portions each having a respective encoding and a respective capacity allocation, and a third frame portion for direct communications between said plurality of first OFDMA wireless communications devices.

10. The communications system according to claim 9 wherein the respective encodings are based upon at least one transmission characteristic for a corresponding wireless communications device; and wherein the respective capacity allocations are based upon at least one traffic condition at the corresponding wireless communications device.

11. The communications system according to claim 9 wherein said wireless base station selectively allocates the second frame portion to take over at least a portion of the frame control header.

12. The communications system according to claim 9 wherein said wireless base station comprises an 802.16 WiMAX base station; and wherein said plurality of first wireless OFDMA communication devices each comprises an IEEE 802.16 WiMAX device.

13. A method of operating a communications system comprising a plurality of first wireless communications devices communicating based upon a first wireless communications protocol, at least one second wireless communications device communicating based upon a second wireless communications protocol different from the first wireless communications protocol, and a wireless base station, the method comprising:

communicating with the plurality of first wireless communications devices and the at least one second wireless communications device based upon a frame structure defined by a plurality of sub-carriers at respective different frequencies and a plurality of symbols at respective different times and comprising a frame control header, a first frame portion for communicating with the plurality of first wireless communications devices based upon the first wireless communications protocol, a second frame portion for communicating with the at least one second wireless communications device based upon the second wireless communications protocol, and a third frame portion for direct communications between the plurality of first wireless communications devices.

14. The method according to claim 13 wherein the first and second frame portions each have a respective encoding and a respective capacity allocation.

15. The method according to claim 14 wherein the respective encodings are based upon at least one transmission characteristic for a corresponding wireless communications device; and wherein the respective capacity allocations are based upon at least one traffic condition at the corresponding wireless communications device.

16. The method according to claim 13 further comprising allocating the frame control header to extend across the plurality of sub-carrier frequencies.

17. The method according to claim 13 further comprising selectively allocating the second frame portion to take over at least a portion of the frame control header.

* * * * *